United States Patent [19]

McSweeney

[11] Patent Number: 4,713,648
[45] Date of Patent: Dec. 15, 1987

[54] VEHICLE RECORDING SYSTEM

[76] Inventor: Hugh A. McSweeney, P.O. Box 389, Malakoff, Tex. 75148

[21] Appl. No.: 778,223

[22] Filed: Sep. 20, 1985

[51] Int. Cl.⁴ ............................................. B60Q 1/00
[52] U.S. Cl. ............................... 340/52 D; 340/692; 307/10 R
[58] Field of Search ............... 340/52 R, 52 D, 692, 340/384 E, 384 R, 691; 307/10 R

[56] References Cited

U.S. PATENT DOCUMENTS

| | | | |
|---|---|---|---|
| 3,200,403 | 8/1965 | Bush | 346/61 |
| 3,281,854 | 10/1966 | Fiehn | 346/18 |
| 3,711,653 | 1/1973 | Barbier | 179/100.1 C |
| 3,792,445 | 2/1974 | Bucks et al. | 346/33 D X |
| 3,792,533 | 2/1974 | Plasser et al. | 33/144 |
| 3,947,812 | 3/1976 | Lee et al. | 340/52 D |
| 4,067,061 | 1/1978 | Juhasz | 340/52 F |
| 4,072,850 | 2/1978 | McGlynn | 340/52 F X |
| 4,222,028 | 9/1980 | Danchilla | 340/52 D |
| 4,409,663 | 10/1983 | Becker | 365/561 |
| 4,502,788 | 3/1985 | Lowden | 368/10 |

Primary Examiner—James L. Rowland
Assistant Examiner—Jeffery A. Hofsass
Attorney, Agent, or Firm—Harold E. Meier

[57] ABSTRACT

A vehicle recording system is provided having an engine vacuum-operated pressure switch for controlling an audio recording device. The pressure switch is preferably mounted in the intake manifold of the engine and generates a control signal representing dynamic engine-operating conditions; e.g. engine starting or stopping. Control circuitry is responsive to the control signal for generating a timer enable signal. A first timer circuit is activated by the timer enable signal to generate a first timing signal over a first predetermined time period for controlling the audio recording device. A second timer circuit is also activated by the timer enable signal to generate a second timing signal over a predetermined time period substantially shorter than the first predetermined time period. The second timer signal is used to generate a buzzer which is activated when the audio recording device is initially turned on. The system also includes a manual override switch for bypassing the operation of the engine vacuum-operated control circuitry.

14 Claims, 2 Drawing Figures

1

VEHICLE RECORDING SYSTEM

TECHNICAL FIELD

The present invention relates generally to recording techniques and more particularly to a vehicle recording system which records spoken messages for a predetermined time period whenever the vehicle engine is started or stopped.

BACKGROUND OF THE INVENTION

It is known in the prior art to provide vehicle ignition-controlled message systems which include a key-operated ignition switch for controlling an associated tape player. In these systems, the tape player is activated for a predetermined time period during which a prerecorded reminder message, e.g. "Fasten Seat Belts" or "Turn Off Lights," is played to the vehicle operator. Such vehicle message reminder systems are shown in U.S. Pat. No. 3,947,812 to Lee, et al. and U.S. Pat. No. 4,222,028 to Danchilla.

Although the vehicle message systems of the prior art have proven effective for their intended purpose, such systems have inherit limitations which have prevented their commercial acceptance. In particular, systems of the type shown in the Lee, et al. Patent require modification to conventional vehicle control circuitry, e.g., the key-operated ignition switch, thus increasing the cost and complexity of the system. Moreover, these ignition-controlled systems do not have the capability for allowing the user to record messages, and they typically operate either when the vehicle engine is started or stopped, but not after both of these conditions occur.

There is therefore a need for a vehicle recording system which obviates modifications to existing vehicle control circuitry and which allows the vehicle operator to record spoken messages over dynamic engine-operating conditions, e.g., whenever the vehicle engine is both started or stopped.

BRIEF SUMMARY OF THE INVENTION

The present invention relates to a vehicle recording system which includes a conventional audio recording device for receiving a tape cartridge on which spoken messages are recorded. In the preferred embodiment, the audio recording device is activated to record any spoken message whenever the vehicle engine is started or stopped.

In operation, a pressure switch is preferably mounted in the intake manifold of the vehicle engine and responds to pressure changes therein to generate a control signal whenever the engine is started. Control circuitry is provided to generate a timer enable signal when the engine is started. This circuitry also serves to generate the timer enable signal when the engine is disabled, regardless of the existence of the control signal from the pressure switch. A first timer circuit is activated by the timer enable signal to generate a first timing signal over a first predetermined time period. The audio recording device is then activated for the first predetermined time period to enable a user to record spoken messages.

According to another feature of the invention, a second timer circuit is simultaneously activated by the timer enable signal to generate a second timing signal over a second predetermined time period substantially shorter than the first predetermined time period. The second timing signal activates an audio signalling device, such as a buzzer, for providing an audio indication that a spoken message may be recorded.

In the preferred embodiment, the system also includes a visual indicator, which remains illuminated while the audio recording device is activated. Moreover, circuitry is provided for inhibiting the operation of the audio recording device if a tape cartridge is not properly received therein. A manual override switch is also provided for bypassing the automatic control system for the audio recording device, thereby allowing the user to record messages at times other than when the vehicle engine is enabled or disabled.

BRIEF DESCRIPTION OF THE DRAWINGS

For a more complete understanding of the present invention and the advantages thereof, reference is now made to the following Description taken in conjunction with the accompanying Drawings in which.

DETAILED DESCRIPTION

Figure 1:
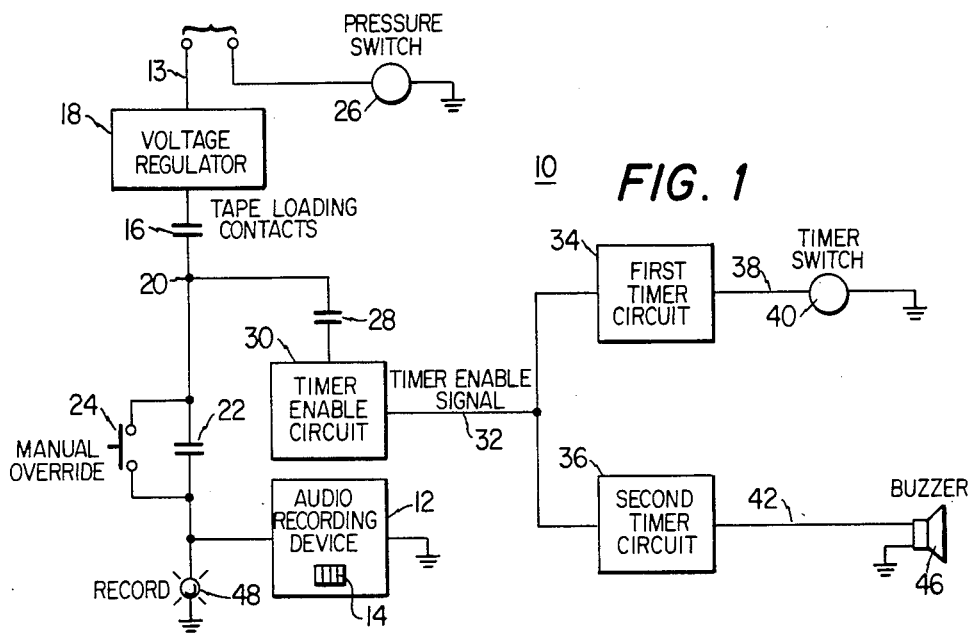
FIG. 1 is a block diagram of the preferred vehicle recording system of the present invention.

Referring now to the drawings wherein like reference characters designate like or similar parts throughout the several views, FIG. 1 is a block diagram of a preferred vehicle recording system 10 of the present invention. System 10 includes a conventional audio recording device 12 preferably having a conventional condenser microphone 14 for recording spoken messages. The audio recording device 12 also includes conventional tape loading contacts 16 which are normally closed when a tape cartridge is inserted in the audio recording device 12. A 12 volt power conductor 13 is connected from the vehicle battery (not shown) to a voltage regulator 18. The voltage regulator 18 generates a regulated output voltage, approximately 6.0 volts, which is then coupled via the tape loading contacts 16 to a node 20. The audio recording device 12 is enabled whenever a normally-open relay 22, or, alternatively, a manual override switch 24, is closed, thereby connecting the regulated supply voltage to the audio recording device 12.

Control of the normally-open relay 22 is provided by an engine vacuum-operated control circuit comprising a pressure switch 26, a normally-open relay 28, and a timer enable circuit 30. The pressure switch 26, which is preferably mounted in the intake manifold of the vehicle engine, responds to pressure changes in the manifold to generate a control signal over dynamic engine operating conditions. For the purposes of further explanation only, it will be assumed that the control signal is generated whenever the engine is started, however, this example is not meant to be limiting. The pressure switch 26 may be set to generate the control signal during any predetermined engine-operating condition.

The control signal is used to close normally-open relay 28 and thereby connect the regulated supply voltage from node 20 to actuate the timer enable circuit 30. In response thereto, and as will be described in more detail below, timer enable circuit 30 generates a timer enable signal on conductor 32, whenever the pressure switch 26 senses that the engine has been started. The timer enable signal is then applied to a first timer circuit 34 and a second timer circuit 36. First timer circuit 34 generates a first timing signal having a predetermined time period "$T_1$." The first timing signal is applied via conductor 38 to a timer switch 40, which in turn closes normally-open relay 22 to thereby activate the audio recording device 12 over the first predetermined period.

As also seen in FIG. 1, the timer enable signal 32 is simultaneously applied to the second timer circuit 36, which generates a second timing signal having a second predetermined time period "$T_2$." The second timing signal is applied via conductor 42 to activate an audio signalling device 46, such as a buzzer.

In operation of the vehicle recording system 10 of FIG. 1, whenever the pressure switch 26 in the intake manifold senses that the engine has been started, the timer enable circuit 30 generates a timer enable signal to simultaneously activate both the first timer circuit 34 and the second timer circuit 36. This operation simultaneously activates the audio recorder device 12 for a first predetermined time period, e.g. 30 seconds, to allow a spoken message to be recorded. The buzzer 46 is also enunciated during the first few seconds that the audio recording device 12 is activated, thereby providing an indication to the vehicle user that the audio recording device 12 is recording any spoken message. A visual indicator 48 is also connected to the relay 22 and is illuminated over the first predetermined time period.

As also seen in FIG. 1, if a tape cartridge is not provided in the audio recording device 12, the tape loading contacts 16 are open, thereby preventing operation of the audio recording device 12. According to another feature of the invention, the engine vacuum-operated control circuitry may be overriden by the manual override switch 24. Depression of switch 24 by the user connects the regulated supply voltage to activate the visual indicator 48 and the audio recording device 12. This enables the user to operate the system 10 at any time, regardless of the engine operating state.

Figure 2:
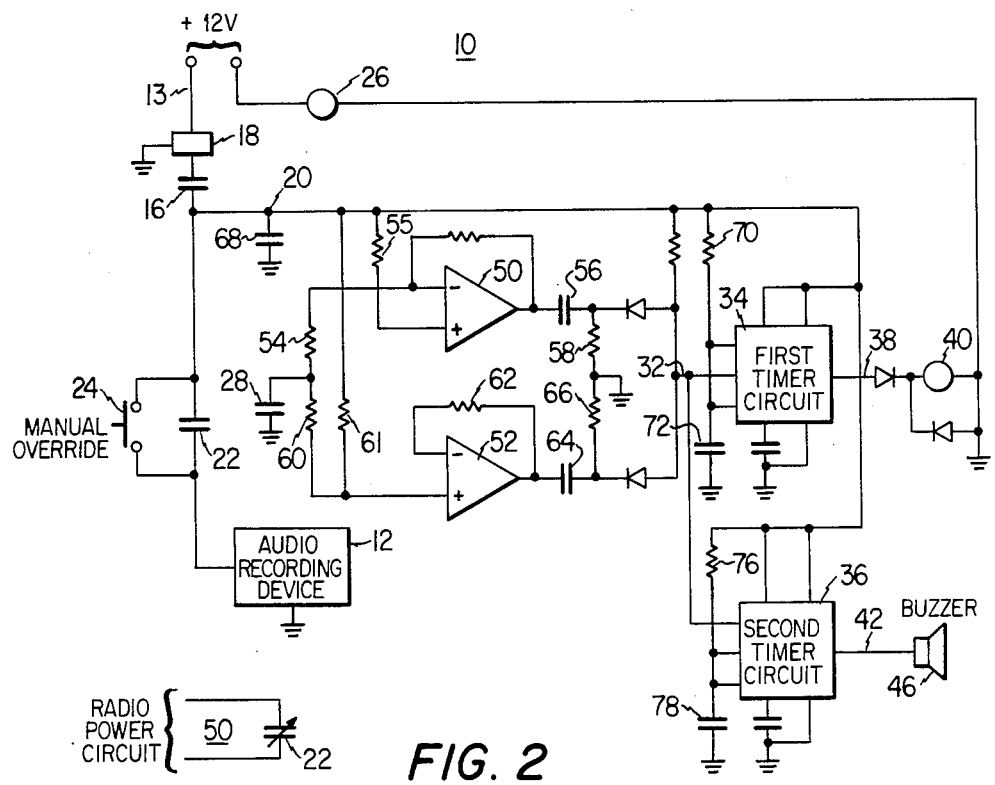
FIG. 2 is a detailed schematic diagram of a preferred embodiment of the vehicle recording system of FIG. 1.

Referring now to FIG. 2, a detailed schematic diagram of the vehicle recording system of FIG. 1 is provided. As shown in FIG. 2, when the control relay 22 is closed, a radio power circuit 50 of the vehicle is opened, thereby interrupting the operation of the vehicle radio while the audio recording device 12 is activated. As also shown in FIG. 2, the timer enable circuit 30 comprises first and second operational amplifiers 50 and 52. Operational amplifier 50 includes an inverting input connected to the relay 28 through a resistor 54, and a non-inverting input connected to the node 20 through a resistor 55. The output of operational amplifier 50 is filtered by a low-pass filter, comprising a capacitor 56 and a resistor 58, to generate the timer enable signal on conductor 32 as discussed above with respect to FIGURE 1. Operational amplifier 52 includes an non-inverting input connected to the relay 28 through a resistor 60 and to the node 20 through a resistor 61, and an inverting input connected to the output of the operational amplifier 52 through a feedback gain resistor 62. The output of the second operational amplifier 52 is filtered by a low-pass filter, comprising a capacitor 64 and a resistor 66, to also generate the timer enable signal.

The first and second operational amplifiers 50 and 52 are provided to ensure that the audio recording device 12 is enabled when the engine is both started and stopped. To this end, the second operational amplifier 52 generates the timer enable signal when the normally-open relay 28 is closed by the pressure switch 26. This operation also charges a capacitor 68, connected between the node 20 and ground. Accordingly, when the engine is later disabled, relay 28 returns to its normally-open state; however, the voltage on capacitor 68 is sufficient to drive operational amplifier 50, thereby again generating the timer enable signal.

A timer enable signal provided from either operational amplifier 50 or 52 is applied to the first timer circuit 34, which in the preferred embodiment is an integrated circuit timer having a time constant determined by resistor 70 and capacitor 72. The first timer circuit 34 generates the first timing signal at the output 38 thereof, which, as discussed above with respect to FIG. 1, is then applied to actuate the switch 40. Switch 40 in turn closes normally-open relay 22 to operate the audio recording device 12 and the visual indicator 48.

As also discussed above with respect to FIG. 1, the timer enable signal is applied to the second timer circuit 36, whose time constant is controlled by a resistor 76 and a capacitor 78. The second timer circuit 36 generates the second timing signal on the output 42 thereof. This signal is then used to activate the buzzer 46. As discussed above with respect to FIG. 1, the buzzer provides a short (e.g. 1–3 second) audible signal to the user to indicate that the audio recording device 12 is activated to record spoken messages.

It can be seen that the present invention provides a unique vehicle recording system which overcomes several problems of prior art devices. The system advantageously provides operation of the audio recording device over dynamic engine-operating conditions; e.g. whenever the engine is started or stopped. A manual override switch is also provided for activating the audio recording device during other periods of vehicle operation. The system also incorporates a visual indicator, which is illuminated whenever the audio recording device is activated, and includes an initial audible alarm to initiate the recording of a spoken message.

Although not shown in detail in the drawings, it is envisioned that the audio recording device 12, which includes the visual indicator 48, is mounted in an unit in or under the vehicle dash. The manual override switch 24 may also advantageously be incorporated in the front panel of the audio recording device.

Although the invention has been described and illustrated in detail, it is to be clearly understood that the same is by way of illustration and example only and is not to be taken by way of limitation. The spirit and scope of this invention are to be limited only by the terms of the appended claims.

I claim:

1. A recording system for a vehicle having an engine, comprising:
    an audio recording device for receiving a tape cartridge on which spoken messages are recorded;
    a pressure switch mounted in the engine and responsive to pressure changes therein for generating a control signal at a predetermined engine operating condition;
    means responsive to the control signal for generating a timer enable signal;
    first timer means activated by the timer enable signal to generate a first timing signal over a first predetermined period; and
    means responsive to the first timing signal over the first predetermined time period for activating the audio recording device to record any spoken message.

2. The recording system for a vehicle as described in claim 1 including means responsive to the first timing signal over the first predetermined time period for providing a visual indication that the audio recording device is activated.

3. The recording system for a vehicle as described in claim 1 further including second timer means activated by the timer enable signal to generate a second timing signal over a second predetermined time period substantially shorter than said first predetermined time period.

4. The recording system for a vehicle as described in claim 3 further including;
an audio signalling device; and
means responsive to the second timing signal over the second predetermined time period for activating said audio signalling device to provide an audio indication that a spoken message is being recorded.

5. The recording system for a vehicle as described in claim 1 further including means for inhibiting operation of the audio recording device if the tape cartridge is not received therein.

6. The recording system for a vehicle as described in claim 1 wherein said means responsive to the first timing signal comprises:
a relay having first and second operating positions, said pressure switch driving said relay from its first operating position to its second operating position in response to the predetermined engine operating condition;
first and second operational amplifiers each having inverting and non-inverting inputs, said relay connected to said inverting input of said first operational amplifier and to said non-inverting input of said second operational amplifier; and
means connected to said non-inverting inputs of said first and second operational amplifiers for storing a voltage which is applied to said first operational amplifier when said relay changes from its second operating position to its first operating position.

7. The recording system for a vehicle as described in claim 6 further including manual override means for bypassing the relay to thereby activate the audio recording device.

8. The recording system for a vehicle as described in claim 1 further including means responsive to the first timing signal for inhibiting a power control circuit for a radio in the vehicle over the first predetermined time period.

9. A recording system for a vehicle having an engine, comprising:
an audio recording device for receiving a tape cartridge on which spoken messages are recorded;
an engine vacuum-operated pressure switch mounted in the intake manifold of the engine and responsive to pressure changes therein for generating a control signal whenever the engine is started;
means responsive to the control signal for generating a timer enable signal whenever the engine is started or stopped;
a first timer circuit activated by the timer enable signal to generate a first timing signal over a first predetermined time period;
a second timer circuit activated by said timer enable signal to generate a second timing signal over a second predetermined time period substantially shorter than the first predetermined time period;
an audio signalling device;
means responsive to the first timing signal over the first predetermined time period for activating the audio recording device to record any spoken message; and
means responsive to the second timing signal over the second predetermined time period for simultaneously activating the audio signalling device to provide an audio indication that a spoken message is being recorded.

10. The recording system for a vehicle as described in claim 9 further including means responsive to the first timing signal over the first predetermined time period for providing a visual indication that the audio recording device is activated.

11. The recording system for a vehicle as described in claim 9 further including means for inhibiting operation of the audio recording device if the tape cartridge is not received therein.

12. The recording system for a vehicle as described in claim 9 further including means for bypassing the means responsive to the first timing signal to thereby activate the audio recording device.

13. The recording system for a vehicle as described in claim 9 further including means responsive to the first timing signal over the first predetermined time period for interrupting a power control circuit of a radio in the vehicle.

14. A recording system for a vehicle having an engine, comprising:
an audio recording device for receiving a tape cartridge on which spoken messages are recorded;
an engine vacuum-operated pressure switch mounted in the intake manifold of the engine and responsive to pressure changes therein for generating a control signal whenever the engine is started;
a normally-open relay connected to said pressure switch;
first and second operational amplifiers each having an inverting and non-inverting input, said relay connected to said inverting input of said first operational amplifier and to said non-inverting input of said second operational amplifier, said first and second operational amplifiers generating a timer enable signal whenever the engine is started or stopped;
a first timer circuit activated by the timer enable signal to generate a first timing signal over a first predetermined time period;
a second timer circuit activated by the timer enable signal to generate a second timing signal over a second predetermined time period substantially shorter than the first predetermined time period;
a visual indicator;
a control switch activated by the first timing signal over the first predetermined time period;
a normally-open relay controlled by the control switch for the first predetermined time period for activating the audio recording device to record any spoken message and for illuminating the visual indicator;
a buzzer; and
means responsive to the second timing signal for the second predetermined time period for simultaneously activating the buzzer to provide an audio indication to a user that a spoken message is being recorded.

* * * * *